Figure 6:
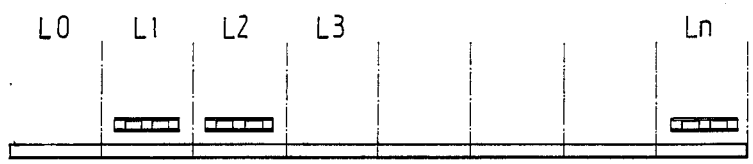

United States Patent [19]

Suominen

[11] Patent Number: 4,732,524
[45] Date of Patent: Mar. 22, 1988

[54] COMPUTER-CONTROLLED STORAGE SYSTEM

[76] Inventor: Seppo Suominen, Lehtokuja 2, SF-76820 Huuha, Finland

[21] Appl. No.: 817,837

[22] PCT Filed: Apr. 9, 1985

[86] PCT No.: PCT/FI85/00038
§ 371 Date: Dec. 4, 1985
§ 102(e) Date: Dec. 4, 1985

[87] PCT Pub. No.: WO85/04638
PCT Pub. Date: Oct. 24, 1985

[30] Foreign Application Priority Data
Apr. 9, 1984 [FI] Finland ................... 841385

[51] Int. Cl.⁴ .............................. B65G 1/04
[52] U.S. Cl. ................... 414/267; 198/468.6; 414/286
[58] Field of Search ............. 414/281, 286, 267, 266, 414/659, 352, 663, 525 B, 273, 495; 198/774, 468.6; 212/94, 95, 96

[56] References Cited

U.S. PATENT DOCUMENTS

| | | | |
|---|---|---|---|
| 3,182,823 | 5/1965 | Chasar | 414/281 |
| 3,417,879 | 12/1968 | Gough | 414/281 |
| 3,746,148 | 7/1973 | Hilger et al. | 198/774 |
| 3,779,395 | 12/1973 | Dykeman | 212/95 X |
| 3,799,057 | 3/1974 | Cassel | 414/273 X |
| 3,809,268 | 5/1974 | Lutz | 414/352 X |

FOREIGN PATENT DOCUMENTS

| | | |
|---|---|---|
| 47559 | 10/1973 | Finland . |
| 67065 | 9/1984 | Finland . |
| 325826 | 7/1970 | Sweden . |
| 348432 | 9/1972 | Sweden . |
| 377316 | 6/1975 | Sweden . |
| 415345 | 9/1980 | Sweden . |
| 2041321 | 9/1980 | United Kingdom ............ 414/525 B |
| 691359 | 10/1979 | U.S.S.R. .......................... 414/331 |

Primary Examiner—Robert J. Spar
Assistant Examiner—Stuart J. Millman
Attorney, Agent, or Firm—Andrus, Sceales, Starke & Sawall

[57] ABSTRACT

A computer-controlled storage system for handling and storing goods items, comprising at least one horizontal storage line provided with rails or equivalent guide members and one or more transport carriages (6) movable along the rails. The system comprises a transport apparatus comprising a power unit (16) with a power transmission mechanism (17) and a rope member (18), connecting these to the transport carriage (6), external to the transport carriage. In addition, the system may comprise a power transmission arrangement connected to the lifting member, external to the transport carriage (6), for lifting a goods item in position above the transport carriage off the guide member to be carried by the transport carriage and for lowering same onto the guide member.

4 Claims, 8 Drawing Figures

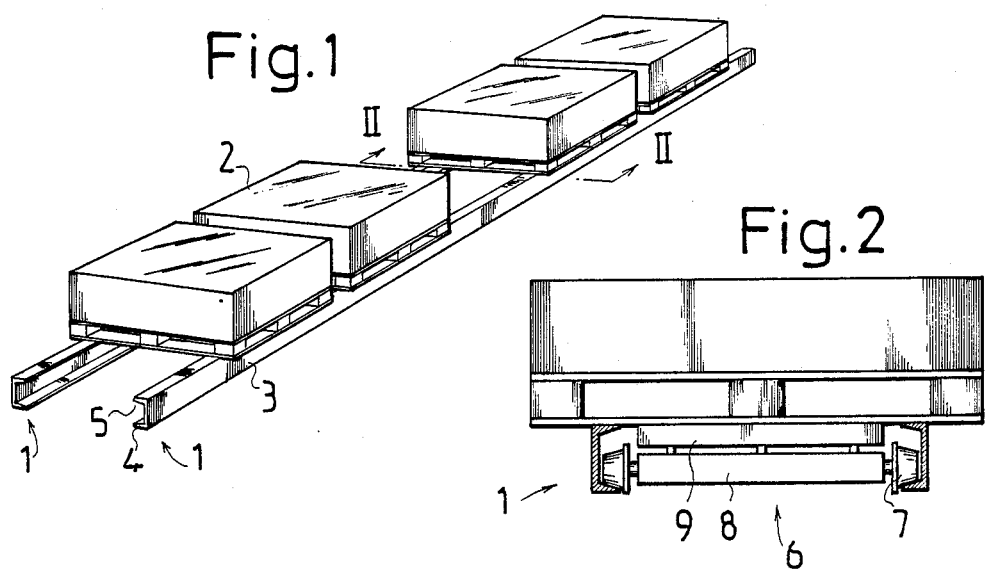
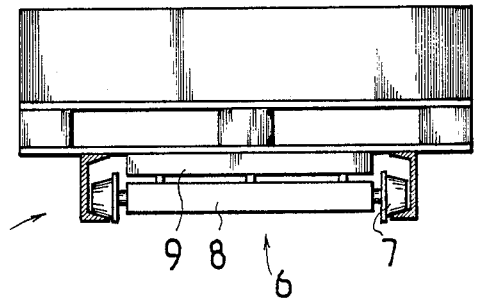
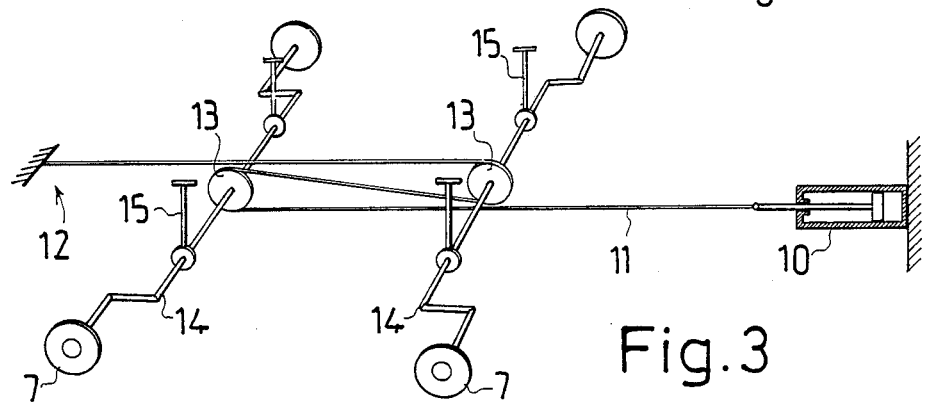
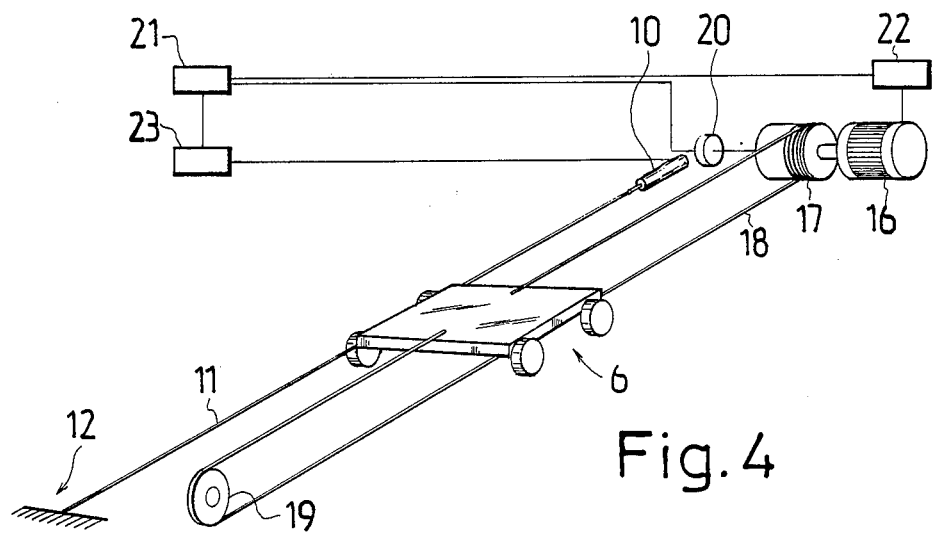

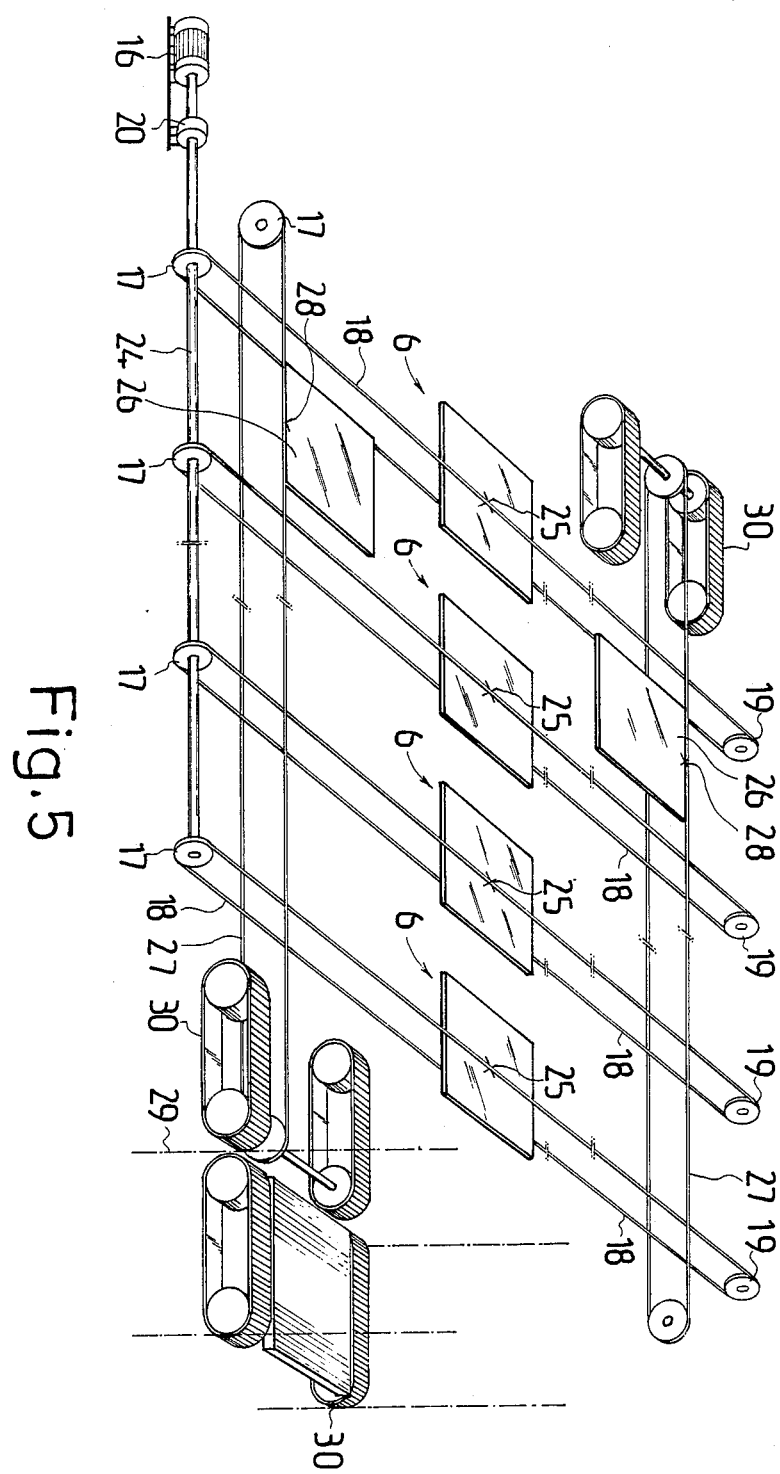

COMPUTER-CONTROLLED STORAGE SYSTEM

The present invention concerns a computer-controlled storage system.

Computer-controlled stores of prior art are based, for instance, on a stacking lifter moving between the store shelves, or on transport carriages moving along storage or transport lines, or on combinations thereof.

In the Finnish Pat. No. 47559 is disclosed a system in which transport carriages moving along storage lines transport goods items in the warehouse. The transport carriages comprise a power unit for moving the carriage and a power unit for lifting the item. The power units obtain their drive power by electric cables.

A drawback in this kind of system is the costly and complex design of the transport carriage and the complexity and susceptibility to faults of the entire system. The transport carriage comprises a lifting means with power unit and a transport means with power unit, whereby in a big, multi-line warehouse a great number of expensive transport carriage constructions are needed. A drawback is also the electric current required by the transport carriages, entailing long, flexible and complicated wirings. Since the cables connected to the carriages are mobile, the electric cables wear out rapidly, and the structures may become electrified.

In addition, in the event of fault, when the transport carriage is stalled on a storage line among the goods, trouble-shooting is difficult. Likewise, the numerous sensors required for locating the transport carriages and storage sites increase the construction and maintenance costs and the susceptibility to faults.

Owning to the use of sensors, the storage sites are predetermined as to their size and location, and therefore the system is not very flexible for storing different-sized batches of goods. Moreover, ample space is required on the ends of the storage lines for conveying the goods into and out of the warehouse.

The object of the present invention is to eliminate the drawbacks mentioned. In particular, the object of the invention is to introduce a new computer controlled storage system in which all electrical functions take place outside the storage lines, in locations with easy access for maintenance, whereby the system is non-costly and reliable in operation.

As to the characteristic features of the invention, reference is made to the claims following below.

In an advantageous embodiment of the invention, two or more transport carriages have been connected to a common power unit with the aid of a chain, rope or equivalent. Hereby, the mutually coupled carriages move simultaneously in parallel, but since the lifting function is independent in each carriage, fully the same functions are accomplished as in the case in which each track has its own power unit.

In an embodiment of the invention, on the ends of the transport lines located over each other are provided e.g. belt conveyors by which the goods packages can be transferred onto a vertical conveyor or a vertical transport line.

In an embodiment of the invention, for said belt conveyors have been substituted truck fork-type lifters with which the goods batches are lifted from horizontal storage or transport lines to be transported vertically.

An advantageous embodiment of the invention is that in which two independently operating transport carriages are placed on one transport or storage line. This implies more flexible and more rapid sorting and transporting of goods.

The advantages of the invention over the state of the transport carriage include placement of the various power units outside the storage lines, aggregated and with easy access for maintenance; absence of long electric leads moving on the storage lines; absence of sensors for indentifying the storage sites; and the possibility to vary the size and locations of the storage sites as need be.

Figure 7:
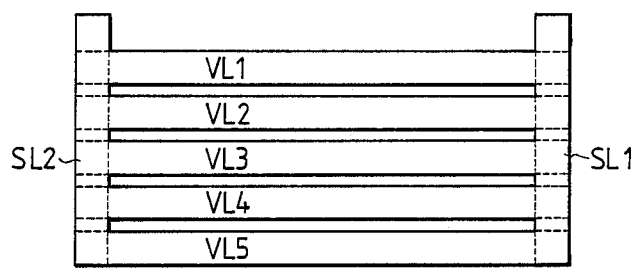
Figure 8:
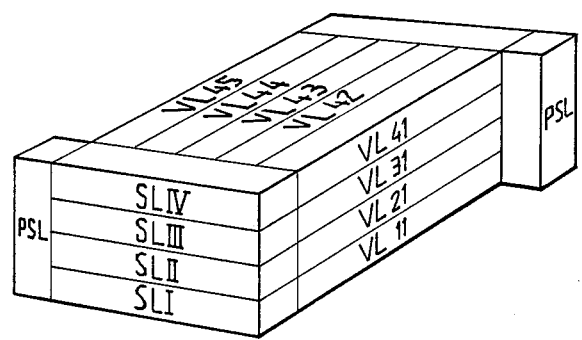

The invention is described in the following in detail, reference being made to the drawings attached, wherein:

FIG. 1 presents a storage line according to the invention, upon which the goods items have been stored, FIG. 2 shows the section along the line II—II in FIG. 1, FIG. 3 presents a model of operation of the lifting member in another embodiment of the invention, FIG. 4 presents the operation diagram of the transport carriage in a third embodiment of the invention, FIG. 5 presents the power transmission arrangements on the storage level in a fourth embodiment of the invention, FIG. 6 presents the elevational view of a storage line in a fifth embodiment of the invention, FIG. 7 presents the storage and transport line system in a sixth embodiment of the invention, FIG. 8 presents the storage system in a seventh embodiment of the invention.

FIGS. 1–2 display a simple storage system according to the invention, the storage and transport line comprising it consisting of parallel, side-by-side rails 1 as shown in FIG. 1, on which the goods items 2 are stored. The rail 1 consists of a web 3, a lower flange 4 and an upper flange 5. In FIG. 2, the transport carriage 6 moves on wheels 7 upon the lower flange 4 of the rail 1. The transport carriage comprises a frame 8 and a lifting member 9, with the aid of which the goods item 2 can be lifted from the rails 1, to be moved, carried by the transport carriage, and lowered back onto the rails for storage.

FIG. 3 presents a functional design of the lifting member 9. The requisite lifting movement may be produced advantageously with the aid of a power unit 10 external to the transport carriage, placed, for example, at the end of the storage line. Power unit 10 may operate, for instance electrically, pneumatically, hydraulically or mechanically. In one embodiment of the invention, shown in FIG. 3, the lifting movement takes place with the aid of a hydraulic cylinder 10. To the cylinder is connected a wire cable 11, of which the other end is fixed at one end 12 of the storage line. The wire cable 11 has been carried back and forth around deflection sheaves 13 rotatably carried on the bell crank-like axles 14 of the wheels 7. When the cylinder 10 pulls the wire cable 11 taut, the axle 14 turns, whereby the bell crank arms 15 linked to the axle rise upwards and produce the desired lifting action. The deflection sheaves 13 are freely rotatable on the axles 14, whereby the degree of tautness of the wire cable 11 has no influence on the movement of the transport carriage, and the movement of the transport carriage has no influence on the operation of the lifting member.

In FIG. 4 is presented the principle of operation of the transport carriage 6. The transport means of the transport carriage consists of a power unit 16, such as an electric motor, of a power transmission mechanism 17, for example a rope drum, and of a rope member 18. The power transmission mechanism 17 has been mounted fixedly with reference to the rails. One end of the rope member 18 looped round the power transmission mechanism has been affixed directly to the transport carriage and the other end, to the transport carriage over a deflection sheave 19 at the opposite end of the rails. In conjunction with the power transmission mechanism is connected a recording means 20, by the aid of which the location of the transport carriage at each instant is stored in the memory of a computer 21.

Moreover, to the transport carriage 6 is connected a lifing mechanism, for instance as in FIG. 3. Likewise, the system also comprises a drive unit 22 for the power unit 16 and a drive unit 23 needed by the lifting mechanism of the transport carriage. The drive unit 22 is most often a frequency converter, with the aid of which the motion of the transport carriage can be smoothly accelerated and decelerated.

In FIG. 5 is presented a store construction design in which a single power unit 16 drives all transport carriages 6 on the storage lines on one level. Therein, the power transmission mechanisms 17 have been connected with the shaft 24 to a common power means 16, and the transport carriages 6 have been connected to the power transmission mechanisms with the aid of ropes 18 as described above. Hereby, all transport carriages 6 move simultaneously, side by side. In FIG. 5, the transport carriages 6 on parallel storage lines have been connected to the rope members 18 substantially at their middle points 25.

The transport carriages 26 on the crossing transport lines interconnecting the parallel storage lines at their ends have been connected to rope members 27, which move the carriages, at the outer margins 28 adjacent to the storage line ends of the transport carriages. Hereby, the rope members 18 and 27 will not obstruct the movements of the transport carriages 6 and 26 at the crossing points of the transfer and storage lines.

At the ends of the transport lines are provided belt conveyors 30, onto which the transport carriages 26 on the transport line transfer the goods, and whence the goods can be transferred onto a vertical transport line 29 provided with a similar belt conveyor 30 and by which the goods can be lowered or lifted to be stored on a given storage level, or to be transported out of the store. When goods are being placed in storage, they are conveyed to the vertical transport line 29 onto the belt conveyor 30, by means of which they are lifted to a certain storage level, and transferred onto the belt conveyor at the end of the transport line and from there further with the transport carriages 26 and 6 to the storage site.

The operation of the storage line of FIG. 6 is as follows. When information concerning an item placed in the storage site Ln is entered into the computer 21, the computer 21 starts the power unit 16 with the aid of a drive unit, whereby the transport carriage moves to the storage site Ln. On the basis of the data entered into the recording means 20, the computer recognizes the arrival of the transport carriage at the storage site Ln and stops the carriage. Thereafter, the computer starts the lifting member 9, and the item is lifted off the rails. Next, the transport carriage is directed to the storage site L3, where the load is set down and the carriage remains in wait for the next command. It is essential in the operation of the unit that the computer memorizes which storage sites are unoccupied and which are occupied, and what kinds of goods there are in each storage site, and that it is capable, with the aid of the transport carriage, by lifting the item off the storage rails, to move it to the desired, computer-controlled location.

By the systems of FIG. 7 is obtained a flexible and completely reorganizable store. Therein, the storage lines VL 1–VL 5 have at both ends been interconnected by vertical transport lines SL 1 and SL 2.

In an advantageous embodiment of the invention, shown in FIG. 8, there are horizontal, parallel storage lines both over each other, VL 11–VL 41, and side by side, VL 41–VL 45. The storage lines located side by side have at both ends been interconnected by horizontal transport lines PSL. In this way, the store may be used efficiently because when the store is emptied at one end the transport lines of the other end may convey additional items into storage. It should be noted that when the storage lines become filled to capacity, the transport lines may also be used for storing items.

The storage system of the invention can be applied in many different ways, of which a few examples are described in the following.

In a fresh goods store, the first stored goods always automatically taken out first, whereby over-age products are avoided. It is further possible to program the computer to discard over-age products from the store.

The system has been constructed to constitute a product store of a production plant manufacturing almost equal quantities of five different products. When an item is conveyed to the store entering point, information thereof is entered into the computer. The transport line will then transfer the item to the beginning of the storage line assigned to the goods in question, from which point the storage line transports it to an expedient, unoccupied storage site. Similarly, when taking goods out of storage information concerning the goods to be shipped is entered, whereby the respective storage line will transport the item to a transport line which delivers it to the exit point.

The system is used as storage in a shop carrying a multitude of different products. When products are being brought for storage, the system transports them to an arbitrary free storage site, but the contents of each storage site with other requisite data is stored in the computer memory.

If it is now desired to extract an item which is located in the middle of a storage line, the system will automatically move the items in front of the desired item to other storage lines, performing transpositions on these storage lines too, as required. In this way, the desired item is picked out of the store. For speeding up the store operations, all the information on the items to be taken out of storage on the following day may be entered into the computer, and the computer is then enabled to arrange the stores overnight so that the required items become rapidly available.

In the foregoing have been presented some embodiment examples of the storage system of the invention. The invention is not, however, confined to these examples: its applications may vary within the inventive idea circumscribed by the claims.

The term "computer-controlled", used in the application, is intended to be understood in its broad sense, to refer not only to computers proper, large or small, but also to various programmable logics, microcircuits or equivalent by which the storage system can be controlled.

I claim:

1. A computer-controlled storage system for moving and storing goods items comprising
   at least two horizontal storage lines provided with guide members, said storage lines lying parallel to each other,
   at least one transport carriage mounted on, and movable along, said guide members of each of said storage lines, each of said carriages comprising a frame and a lifting member;
   drive means moving said transport carriages along said guide members, said drive means comprising a power unit external to said transport carriages, a power transmission mechanism for said transport carriages, and cable means connecting said carriages to said mechanism;
   a power transmission arrangement external to the transport carriages and continuously connected to said lifting member of each of said transport carriages for raising said lifting member to lift a goods item positioned on said guide members above the lifting member off said guide members for movement with the transport carriage, said power transmission arrangement lowering said lifting member so that the goods item rests on the guide members for storage, said power transmission arrangement being operable to raise or lower said lifting member at any location along said guide members, said transport carriages being so mounted on said guide members as to be movable to any desired position along the storage lines beneath goods items resting on said guide members when the lifting member is in the lowered position; and
   locating and controlling means operatively associated with said power transmission mechanism of said drive means and having recording means coupled to said power transmission mechanism for determining the location of the transport carriages along said storage lines and for storing same in the memory of a computer,
   said power transmission mechanism (17) of said transport carriages being connected to a common power unit (16) and recording means (20) so that said transport carriages move simultaneously in parallel.

2. A storage system according to claim 1 wherein the drive means comprises a common electric motor (16) and a cable drum (17) and deflection sheave (19) for each of said transport carriages, and wherein said cable means includes a cable (18) for each of said transport carriages, said cables running from one end of the transport carriages (6), over the deflection sheaves and the cable drums, to the other end of the transport carriages.

3. A storage system according to claim 1 wherein the system comprises a crossing horizontal transport line interconnecting said parallel, horizontal storage lines.

4. A storage system according to claim 1, wherein the system comprises a plurality of horizontal, parallel storage lines one above the other, the storage lines being interconnected by a vertical transport line.

* * * * *